United States Patent
Singhee

(10) Patent No.: US 8,682,818 B2
(45) Date of Patent: *Mar. 25, 2014

(54) PARETO SAMPLING USING SIMPLICIAL REFINEMENT BY DERIVATIVE PURSUIT

(75) Inventor: Amith Singhee, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,814

(22) Filed: Sep. 4, 2012

(65) Prior Publication Data

US 2012/0330883 A1  Dec. 27, 2012

Related U.S. Application Data

(63) Continuation of application No. 12/814,043, filed on Jun. 11, 2010.

(51) Int. Cl.
*G06F 19/00* (2011.01)
*G06T 1/00* (2006.01)

(52) U.S. Cl.
USPC .......................................................... 706/13

(58) Field of Classification Search
USPC ............................................ 706/13; 345/473
See application file for complete search history.

(56) References Cited

U.S. PATENT DOCUMENTS 5,850,229 A * 12/1998 Edelsbrunner et al. ....... 345/473
7,593,834 B2 9/2009 Levitan et al.
7,630,928 B2 12/2009 Bonissone et al.

OTHER PUBLICATIONS

K. Harada et al., "Uniform Sampling of Local Pareto-Optimal Solution Curves by Pareto Path Following and its Applications in Multi-Objective GA," ACM, Proceedings of the 9th Annual Conference on Genetic and Evolutionary Computation, Jul. 2007, pp. 813-820, London, England.
D. Büche et al., "Self-Adaptation for Multi-Objective Evolutionary Algorithms," Proceedings of the Second International Evolutionary Multi-Criterion Optimization, Jan. 2003, pp. 267-281.
Victor Pereyra, "Fast Computation of Equispaced Pareto Manifolds and Pareto Fronts for Multiobjective Optimization Problems," Mathematics and Computers in Simulation, Feb. 2009, pp. 1935-1947, vol. 79, No. 6.
M. Brown et al., "Directed Multi-Objective Optimisation," International Journal of Computers, Systems and Signals, 2005, pp. 3-17, vol. 6, No. 1.
S.L. Ho et al., "A Tabu Method to Find the Pareto Solutions of Multiobjective Optimal Design Problems in Electromagnetics," IEEE Transactions on Magnetics, Mar. 2002, pp. 1013-1016, vol. 38, No. 2.
S.Y. Yang et al., "An Improved Tabu-Based Vector Optimal Algorithm for Design Optimizations of Electromagnetic Devices," IEEE Transactions on Magnetics, Mar. 2004, pp. 1140-1143, vol. 40, No. 2.

* cited by examiner

*Primary Examiner* — Jeffrey A Gaffin
*Assistant Examiner* — Ola Olude Afolabi
(74) *Attorney, Agent, or Firm* — Preston J. Young; Ryan, Mason & Lewis, LLP

(57) ABSTRACT

A method of optimizing a plurality of objectives includes the steps of initializing a set of simplices; selecting a simplex from the set of simplices; computing one or more weights based at least in part on the selected simplex; and generating a point on a tradeoff surface by utilizing the one or more weights in a weighted-sum optimization.

15 Claims, 12 Drawing Sheets

PARETO SAMPLING USING SIMPLICIAL REFINEMENT BY DERIVATIVE PURSUIT

CROSS-REFERENCE TO RELATED APPLICATION

This application is a Continuation of U.S. patent application Ser. No. 12/814,043, filed on Jun. 11, 2010, the disclosure of which is fully incorporated herein by reference.

FIELD

The present application is directed generally toward optimizing multiple objectives, including but not limited to those which occur in integrated circuit design.

BACKGROUND

Many design problems amount to an exercise in balancing multiple objectives, or what is known as a multi-objective optimization problem. For example, it is often desirable to simultaneously minimize each of a plurality of objectives, while satisfying various constraint functions. Moreover, there are often conflicts between the different objectives such that minimizing one causes another to increase in value, thereby resulting in tradeoffs between objectives. Having a design methodology that can explore tradeoffs would significantly aid fast design convergence at any abstraction level, so as to arrive at a design point that truly is the "sweet spot."

For example, in the field of VLSI (very large scale integration) integrated circuit design, at the highest abstraction level of implementing a full chip, there is typically a tight and difficult to estimate tradeoff between power and speed. If the speed of an SRAM bitcell is increased, for example, more leakage power is typically consumed as a tradeoff. There are often several constraints on this design problem; e.g., technology capability, market forces, the design methodology, chip area, the system around the chip and design schedule. Many of these constraints could, themselves, be objectives: ideally a designer would also like to analyze the power-performance tradeoffs with chip area, the design schedule and technology costs.

Typically, designers would like to explore the tradeoff between the objectives to pick the solution that best fits their design requirements. One reason for this is that the design goals are not fully determined and an exploration of the tradeoffs is necessary to determine design capability, which in turn may be used to guide the design goals. This is often the case for SRAM bitcell design, since the bitcell is often designed during the early phases of technology development. At this time, the technology, the models and the design specifications coming from the array design are all in flux, and it is very difficult to have all requirements fixed. Knowledge of the full tradeoff between the objectives lets the designer choose a design that meets current requirements and is flexible to adapt at low cost as needs change

SUMMARY

An illustrative embodiment of the present invention includes a method of optimizing a plurality of objectives includes the steps of initializing a set of simplices; selecting a simplex from the set of simplices; computing one or more weights based at least in part on the selected simplex; and generating a point on a tradeoff surface by utilizing the one or more weights in a weighted-sum optimization.

Another illustrative embodiment of the present invention includes a method for designing an integrated circuit. The method includes a step of optimizing a plurality of design objectives. This optimizing step includes the steps of initializing a set of simplices, selecting a simplex from the set of simplices, computing one or more weights based at least in part on the selected simplex, and generating a point on a tradeoff surface by utilizing the one or more weights in a weighted-sum optimization. The method also includes a step of designing the integrated circuit based at least in part on the optimized plurality of design objectives.

These and other objects, features, and advantages of the present invention will become apparent from the following detailed description of illustrative embodiments thereof, which is to be read in connection with the accompanying drawings.

DETAILED DESCRIPTION

A typical multi-objective optimization problem may be expressed as follows:

$$\min_x f(x) = [f_1(x)\ f_2(x)\ \ldots\ f_d(x)]^T \quad (1)$$

$$\text{s.t.}\ g(x) \le 0,\ h(x) = 0,\ x \in X,$$

where X is the domain of search and $^T$ denotes a transpose operation. A goal is to simultaneously minimize each of the d objectives, thereby minimizing objective function f(x), while satisfying the vectors of constraint functions g(x) and h(x). Let $\mathcal{F}$ be the space of objective values $\{f_i\}$. Then any set of objective values $f = \{f_1, f_2, \ldots, f_d\}$ is a vector in this space. Let F be the feasible region defined as $$F = \{f(x) : g(x) \le 0, h(x) = 0, x \in X\}. \quad (2)$$

Figure 1A:
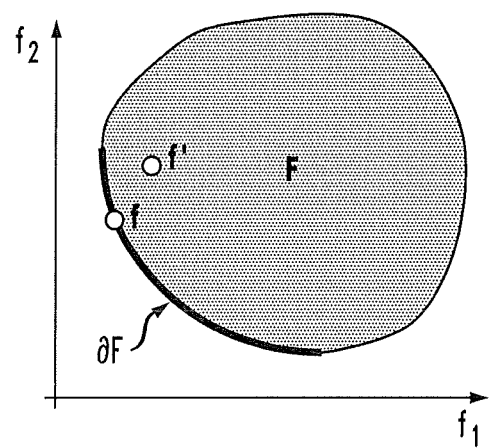
FIG. 1A shows an exemplary two-dimensional tradeoff surface.

FIG. 1A shows an exemplary two-dimensional tradeoff surface. The Pareto front (or the tradeoff surface) $\partial F$ is defined as the set of Pareto-optimal points in F. A point f is Pareto-optimal if and only if there is no $f' \in F$, such that $$f'_i \le f_i, \forall i \in \{1, \ldots, d\} \text{ and } \exists k \in \{1, \ldots, d\} : f'_j < f_j; \quad (3)$$

that is, there is no other point in F that has a smaller or equal value for all objectives than f. Although the illustrative embodiments described herein assume that F is closed and simply connected, F can be of any form.

Figure 1B:
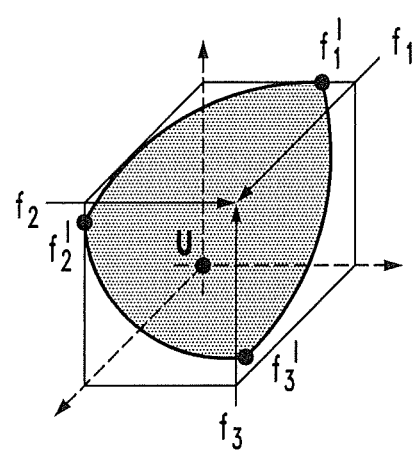
FIG. 1B shows an exemplary three-dimensional tradeoff surface including individual minima for three objectives.

FIG. 1B shows an exemplary three-dimensional tradeoff surface. $f_i^I$ denotes the individual minimum for objective $f_i$ and can be generated by minimizing only $f_i$ while ignoring all other objectives, or equivalently, by choosing $\alpha_i = 1$ and $\alpha_{j \ne i} = 0$. In FIG. 1B, individual minima for three objectives, $f_1$, $f_2$ and $f_3$, are shown as $f_1^I$, $f_2^I$ and $f_3^I$, respectively. U is a utopia point and will discussed further with reference to FIG. 1C.

Figure 1C:
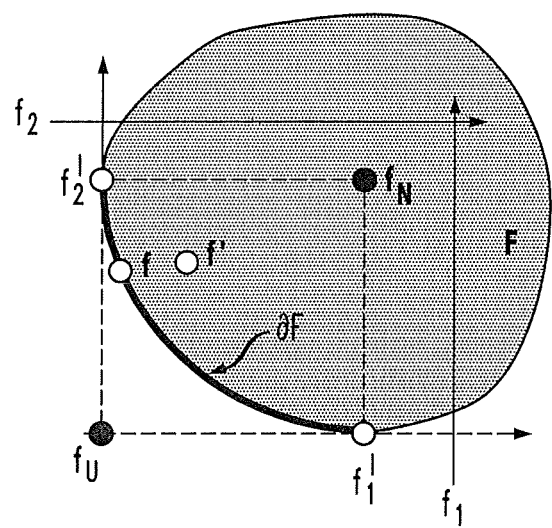
FIG. 1C shows an exemplary two-dimensional tradeoff surface including individual minima for two objectives and utopia and nadir points.

FIG. 1C shows the exemplary two-dimensional tradeoff surface from FIG. 1A. However, in FIG. 1C, individual minima for two objectives, $f_1$ and $f_2$, are shown as $f_1^I$ and $f_2^I$, respectively. Also, the utopia point, $f^U$, and the nadir point, $f^N$ are shown in FIG. 1C. These are defined as $$f^U = \{f_{11}^I, \ldots, f_{dd}^I\},$$

$$f^N = \{\max(f_{11}^I, f_{21}^I, \ldots, f_{d1}^I), \ldots,$$
$$\max(f_{1d}^I, \ldots, f_{dd}^I)\}, \quad (4)$$

where $f_{ij}^I$ is the j-th component of $f_i^I$.

There are several techniques for solving optimization problems such as (1). For example, various methods, such as the Normal-Boundary Intersection method and the Normal Constraint method, use a sequence of single-objective optimization runs to sample the tradeoff surface, and use some additional constraints to guide each run at a desired location on the surface. However, the additional constraints required by these techniques can make the optimization problem more difficult, resulting in convergence to local minima or longer run times for each optimization run.

As another example, an evolutionary algorithm could be used with solution fitness defined by its non-domination by other solutions. Examples of such techniques include encoding the notion of Pareto optimality into a gene goodness function, the non-denominated sorting genetic algorithm (NSGA) method, or the strength Pareto evolutionary algorithm (SPEA) method. However, these evolutionary algorithms tend to have very high computational costs associated therewith because of the lack of a strong search direction and the need for maintaining large populations. Often, several thousand candidates need to be tried before solutions converge.

Another approach to solving (1) above is to optimize convex-weighted sums of the objectives. To do this, the multi-objective optimization problem is converted into a single objective problem by placing acceptable thresholds on all but one objective, thereby converting these objectives into constraints. The new weighted objective is defined as:

$$f_1^\alpha = w^T f = \alpha_1 f_1 + \alpha_2 f_2 + \ldots + (1 - \Sigma_{i=1}^{d-1} \alpha_i) f_d, \quad (5)$$

$$0 \le \alpha_i \le 1 \text{ for all } i, \text{ and } \Sigma_{i=1}^{d-1} \alpha_i \le 1. \quad (6)$$

w is a strictly non-negative, non-trivial vector, and $\alpha = \{\alpha_1, \ldots, \alpha_{d-1}\}$ is the vector of weights. The optimization problem can now be written as:

$$\min_x f_1^\alpha,\ \text{s.t.}\ g(x) \le 0,\ h(x) = 0,\ x \in X. \quad (7)$$

The weights $\alpha_i$ allow us to relatively prioritize the objectives for the optimization. For example, if $\alpha_1 = \alpha_2 = 0.5$ and all other $\alpha_i = 0$, the optimization will only try to minimize the objectives $f_1$ and $f_2$ and ignore the others.

One method of sampling the Pareto surface $\partial F$ uniformly is to sweep the weights uniformly while satisfying (6), and run a single objective optimization for each resulting combination of weights. For a given sweep stepsize, $d\alpha$, the combinations can be generated as:

$$\alpha_1 = 0 : d\alpha : 1 \quad (8)$$
$$\alpha_2 = 0 : d\alpha : (1 - \alpha_1)$$
$$\ldots$$
$$\alpha_i = 0 : d\alpha : \left(1 - \sum_{j=1}^{i-1} \alpha_j\right) \text{ for } i < d \ldots$$

The question of where a particular choice of weights put us on $\partial F$ can be answered by deriving a direct relationship between the weights $\alpha$ and the partial derivatives of the Pareto front $\partial F$. In the illustrative embodiments described herein, it is assumed that the origin has been translated to the utopia point $f^U$ shown in FIG. 1B. Although this translation helps avoid unnecessary notational clutter, it does not affect the results and is not necessary.

Any solution to the problem (7) should satisfy the following theorem:

Let $\partial F$ be continuously differentiable, and let $f^{\alpha*}$ be the global solution to the problem (7). Then 1. $f^{\alpha*}$ lies on $\partial F$,
2. the vector w is normal to $\partial F$ at $f^{\alpha*}$, and
3. the tangent plane at $f^{\alpha*}$ does not intersect $\partial F$ elsewhere where it is not tangent to $\partial F$.

The proof of this theorem is as follows: f is a vector in $\mathcal{F}$ and $f_1^{\alpha = w^T} f$ is the projection of f on the direction vector w defined by the choice of weights $\alpha = \{\alpha_1, \ldots, \alpha_{d-1}\}$. Hence, (7) minimizes this projection.

Figure 2A:
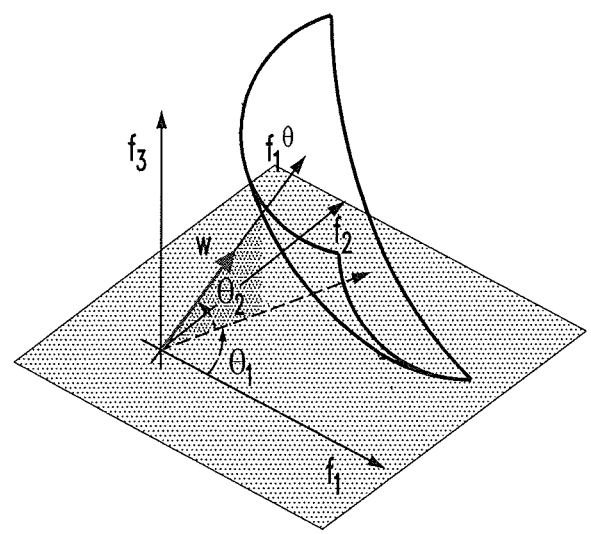
FIG. 2A shows a solution for an optimization problem prior to rotation.
Figure 2B:
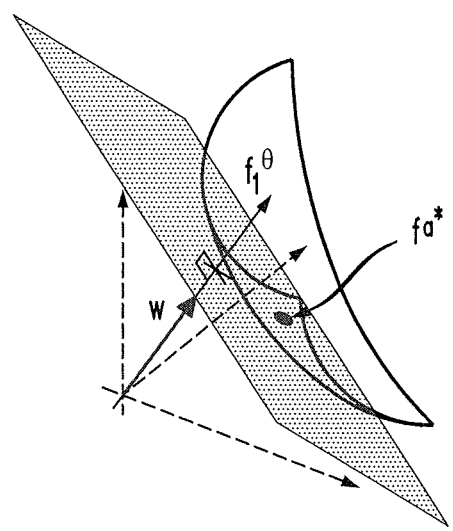
FIG. 2B shows a solution for an optimization problem subsequent to rotation.

To express this idea in a more convenient way, the axes in this system can be rotated such that the rotated $f_1$ axis is aligned with the vector w, and in the same direction. FIG. 2A shows a system prior to rotation and FIG. 2B shows a system subsequent to rotation. The rotated version of any $f_i$ can then be denoted by $f_i^\theta$, where the vector $\theta = \{\theta_1, \ldots, \theta_{d-1}\}$ denotes the sequence of angles by which the system was rotated.

Now, any solution $f^{\alpha*}$, such as that shown in FIG. 2B, that minimizes $f_1^\alpha$ as per (7) essentially minimizes the value of the coordinate $f_1^\theta$ in the rotated system, while satisfying the constraints of (7). The other rotated coordinates can take up any value as necessary to minimize $f_1^\theta$ while satisfying the constraints.

The feasible region F, and hence the Pareto surface of $\partial F$, lies in the positive orthant of the original coordinate system, and so does w as per (6). Consequently, in the rotated system, $\partial F$ and the feasible region lies in the positive half plane defined by $f_1^\theta > 0$. If $f_1^\theta$ is minimized while staying feasible, the solution point must then lie on $\partial F$. This is because for any point $f^\theta = \{f_1^\theta, \ldots, f_d^\theta\}$ in F, that is not in $\partial F$, one can find a neighboring point $f^\theta - \{\partial f, 0, \ldots, 0\}$ that is feasible and has a smaller value for the $f_i^\theta$ coordinate, until we reach $\partial F$. This proves claim 1 of the theorem.

Given this, for (7) one can equivalently search only on the $\partial F$ manifold and drop all constraints in (7), since the solution for any choice of $\alpha$ as per (6) will lie on it. The resulting formulation is $$\min_{\{f_1^\theta, f_2^\theta, \ldots, f_d^\theta\} \in \partial F} f_1^\theta \qquad (9)$$

$f^{\alpha*}$ is a solution of (7) for some $\alpha$ and can be written in the rotated system as $f^{\theta*} = \{f_1^{\theta*}, \ldots, f_d^{\theta*}\}$, which is also a solution of (9) and minimizes $f_1^\theta$ to the value $f_1^{\theta*}$. Since $f^{\theta*}$ lies on $\partial F$ and $\partial F$ is continuously differentiable, $\partial F$ can be written in the neighborhood of $f^{\theta*}$ in the following explicit analytical form:

$$f_1^\theta = h(f_2^\theta, \ldots, f_d^\theta). \qquad (10)$$

An example of h( ) is a Taylor expansion of $f_1^\theta$ restricted to $\partial F$, in terms of $\{f_2^\theta, \ldots, f_d^\theta\}$ around $f^{\theta*}$. In this neighborhood, (9) can be simplified to the following unconstrained form:

$$\min_{\{f_2^\theta, \ldots, f_d^\theta\}} f_1^\theta = h(f_2^\theta, \ldots, f_d^\theta) \qquad (11)$$

From the Karush-Kuhn-Tucker (KKT) necessary condition, the partial derivatives of $f_1^{\theta'}$ at the solution $f^{\theta*}$ must be zero:

$$\nabla f_1^\theta(f^{\theta*}) = 0. \qquad (12)$$

Also, the plane tangent to $\partial F$ at $f^{\theta*}$ is given by $$P: [-1 \nabla f_1^\theta(f^{\theta*})^T] f^\theta = [-1 \nabla f_1^\theta(f^{\theta*})^T] f^{\theta*}. \qquad (13)$$

Using (12) in (13), this plane can be written as $$P: f_1^\theta = f_1^{\theta*}, \qquad (14)$$

which is also normal to the $f_1^\theta$ axis, and hence, normal to the w vector in the original coordinate system. This proves part 2 of the theorem.

Now, assume that this tangent plane, which is tangent at the global optimum of (7), intersects $\partial F$ at some other point $f^{\theta'}$ where it is not tangent to $\partial F$. Then, in the neighborhood of $f^{\theta'}$ one can assume an explicit form of $\partial F$ similar to (10), and write the optimization problem as (11). The plane P has all partial derivatives equal to zero, as per (14) and if it is not tangent to $\partial F$ at $f^{\theta'}$, then $$\nabla f_1^\theta(f^{\theta'}) \neq 0. \qquad (15)$$

This violates the KKT necessary condition at $f^{\theta'}$, and it follows that there is a better solution possible. Since, $f^{\theta'}$ lies on the plane P: $f_1^\theta = f_1^{\theta*}$, this better solution will have a smaller value of $f_1^\theta$. Hence, there is a contradiction with the prior assumption that $f^{\theta*}$ is the global optimum. This proves part 3.

This theorem can then be used to derive a relation between the optimization weights $\{\alpha_1, \ldots, \alpha_{d-1}\}$ and the derivatives of $\partial P$. This will indicate exactly where on $\partial F$ the optimization (7) lands.

Corollary Let $\partial F$ be continuously differentiable and let $f^{\alpha*}$ be a solution to problem (7). Then $$\frac{\partial f_d}{\partial f_i}(f^{\alpha*}) = -\frac{\alpha_i}{1 - \sum_{j=1}^{d-1} \alpha_j}, \quad 1 \leq i < d. \qquad (16)$$

This corollary can be proved as follows: the theorem states that the vector $w = \{\alpha_1, \ldots, \alpha_{d-1}, 1 - \Sigma_{j=1}^{d-1}\}$ is normal to $\partial F$ at the solution point $f^{\alpha*}$. $\partial F$ can be written at any point that lies on it, in the explicit form $$f_d = h_d(f_1, \ldots, f_{d-1}). \qquad (17)$$

Then the inward pointing normal vector to $\partial F$ at that point is $$n = \left[ -\frac{\partial f_d}{\partial f_1} \cdots -\frac{\partial f_d}{\partial f_{d-1}} 1 \right]^T, \qquad (18)$$

which is parallel to w at $f^{\alpha*}$. If w is normalized to match its d-th coordinate to the d-th coordinate value of n (i.e., 1), the result is (16).

These observations explain the problem with the standard approach of uniformly sweeping the weights $\alpha_i$ in (7). The choice of the vector $\alpha$ relates to the the partial derivatives of the Pareto front $\partial F$ and not the position on $\partial F$. Hence, a uniform spread in the weights will ensure some systematic choice of the partial derivatives that are sampled on $\partial F$, but the resulting points on $\partial F$ will depend completely on the distribution of these derivatives across it. Consequently, the spread of the points can vary dramatically from one form of $\partial F$ to another and no spatial uniformity is guaranteed.

Figure 3A:
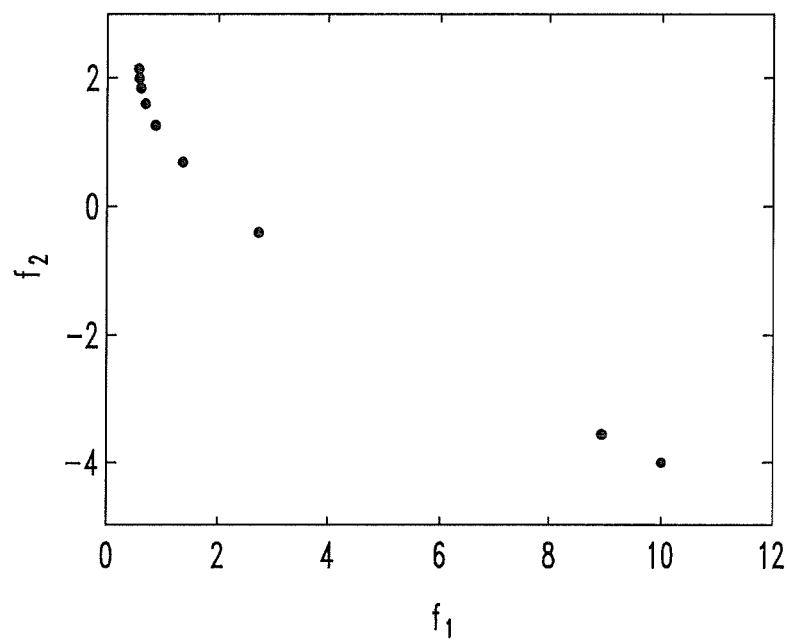
FIG. 3A shows 11 Pareto samples for a two-dimensional tradeoff surface according to a uniform sweep.

FIG. 3A shows the points generated for the following two objective, five variable case, by sweeping $\alpha_1$ from 0 to 1 in steps of 0.1, thereby obtaining 11 data points.

$$\min_{\{x_1, \ldots, x_5\}} f_1 = \|x\|^2, \ f_2 = 3x_1 + 2x_2 - \frac{x_3}{3} + \frac{(x_4 - x_5)^3}{100}, \qquad (19)$$

$$\text{s.t.} \begin{cases} \|x\|^2 - 10 \leq 0 \\ x_1 + 2x_2 - x_3 - 0.5x_4 + x_5 - 2 = 0 \\ 4x_1 - 2x_2 + 0.8x_3 + 0.6x_4 + 0.5x_5^2 = 0 \end{cases}$$

As can be seen in FIG. 3A, the use of uniform weights does not guarantee a uniform distribution of samples on the tradeoff surface.

An illustrative embodiment of the present invention allows one to sample the weights with the goal of generating uniformly distributed points on $\partial F$ irrespective of the distribution of its partial derivatives and without enforcing additional constraints on the original optimization problem. Rather, the weights are generated adaptively by exploiting the relationship between the objective weights and the partial derivatives of the tradeoff surface. In a sense, this illustrative embodiment performs a Monte Carlo analysis on ∂F following a uniform distribution defined over ∂F.

Figure 3B:
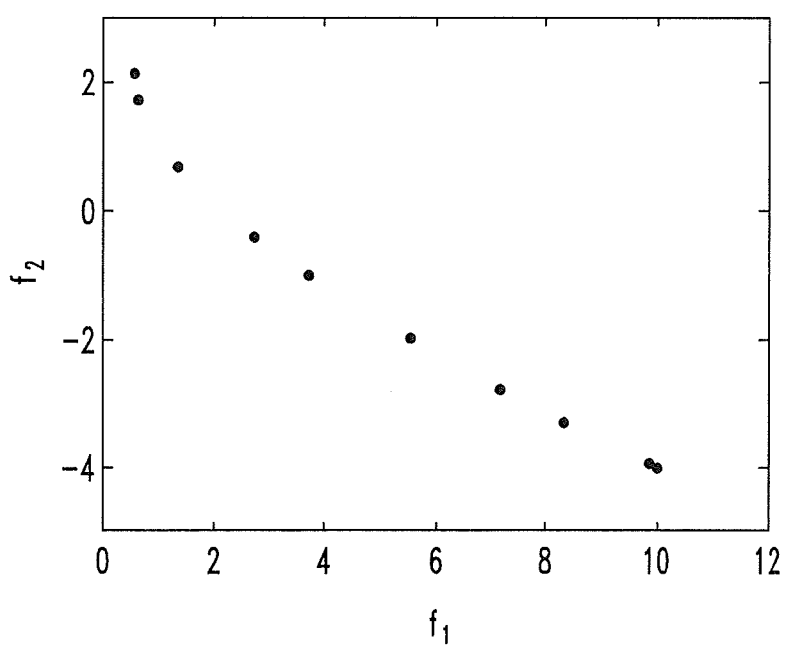
FIG. 3B shows 11 Pareto samples for a two-dimensional tradeoff surface according to an illustrative embodiment of the present invention.

FIG. 3B shows results for (19) using 11 iterations of an illustrative embodiment of the present invention. The improved uniformity, with the same number of points, can clearly be seen. Generally, it is preferable to apply the exemplary techniques described herein to convex regions of the tradeoff region.

Figure 4A:
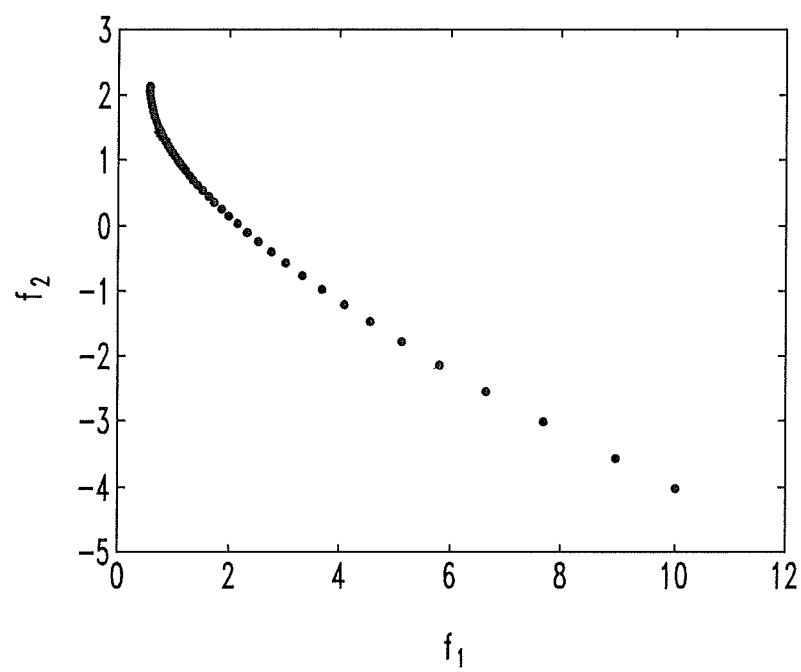
FIG. 4A shows 101 Pareto samples for a two-dimensional tradeoff surface according to a uniform sweep.
Figure 4B:
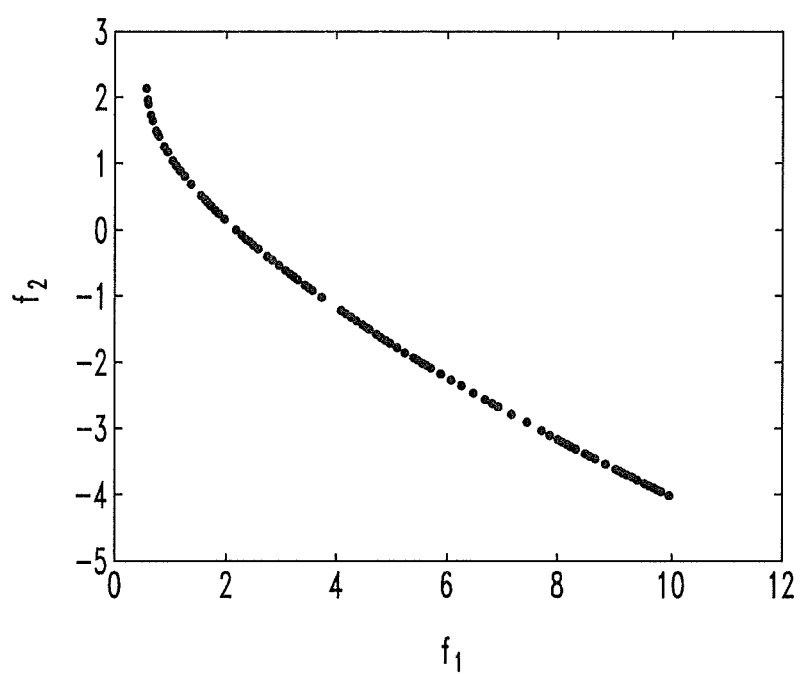
FIG. 4B shows 101 Pareto samples for a two-dimensional tradeoff surface according to an illustrative embodiment of the present invention.

FIGS. 4A and 4B are similar to FIGS. 3A and 3B, respectively, except with 101 data points rather than 11 data points. The difference is more, rather than less, pronounced with greater numbers of data points.

Figure 5:
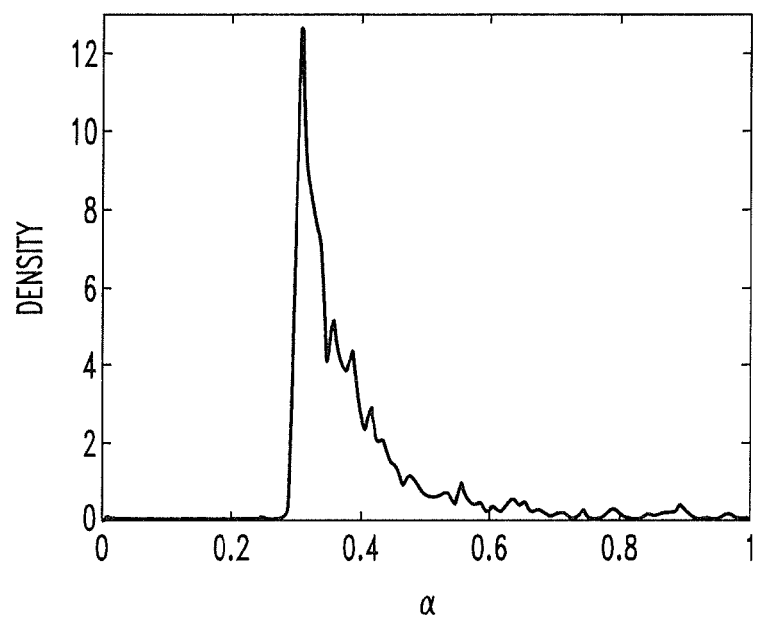
FIG. 5 shows a distribution of 1001 Pareto sampling weights for a two-dimensional tradeoff surface according to an illustrative embodiment of the present invention.

FIG. 5 shows the distribution of α values generated using 1001 iterations of an illustrative embodiment of the present invention to obtain a uniform sampling of (19). It is clearly very different from a uniform distribution of α. This clearly illustrates the difficulty with using uniform weights: different forms of ∂F can require completely different distributions of the weights.

Figure 6:
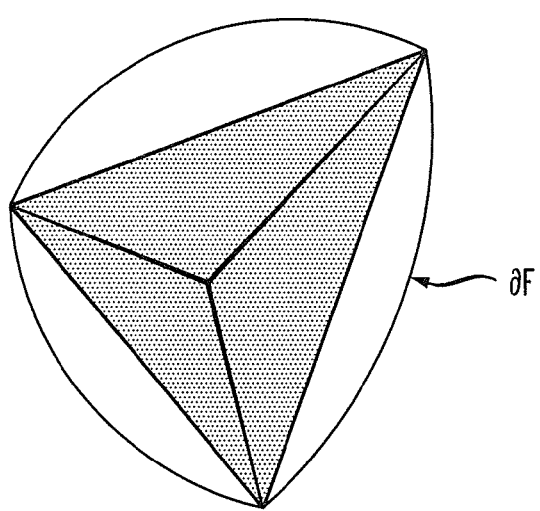
FIG. 6 shows a simplical approximation according to an illustrative embodiment of the present invention.

FIG. 6 shows a simplicial approximation of ∂F according to an embodiment of the present invention. An illustrative embodiment of the present invention uses known partial derivative information to guide the generation of weights for subsequent sampling of ∂F. The partial derivatives at already sampled points are known from (16), and are indexed using a simplicial approximation of ∂F: a set of abutting (d−1)-simplices. A (d−1)-simplex is a (d−1)-dimensional polytope that has d vertices; e.g., a triangle in two dimensions and a tetrahedron in three dimensions. FIG. 6 shows the case where d=3.

Such an approximation of a convex surface falls under the general class of polyhedral approximations, as described in R. V. Efremov et al, "Properties of a Method for Polyhedral Approximation of the Feasible Criterion Set in Convex Multiobjective Problems," *Ann. Oper. Res.*, 166, 2009, incorporated by reference herein. Each vertex is a point on ∂F that has been generated using some α in (7), and thus all simplex vertices lie on ∂F. In an illustrative embodiment, this model of ∂F is used to define the next desired sample and the corresponding values of α. New points can then be added incrementally. Because the partial derivatives of a solution point for any given set of weights are known, these known partial derivatives can be used to compute the next set of weights.

Figure 7:
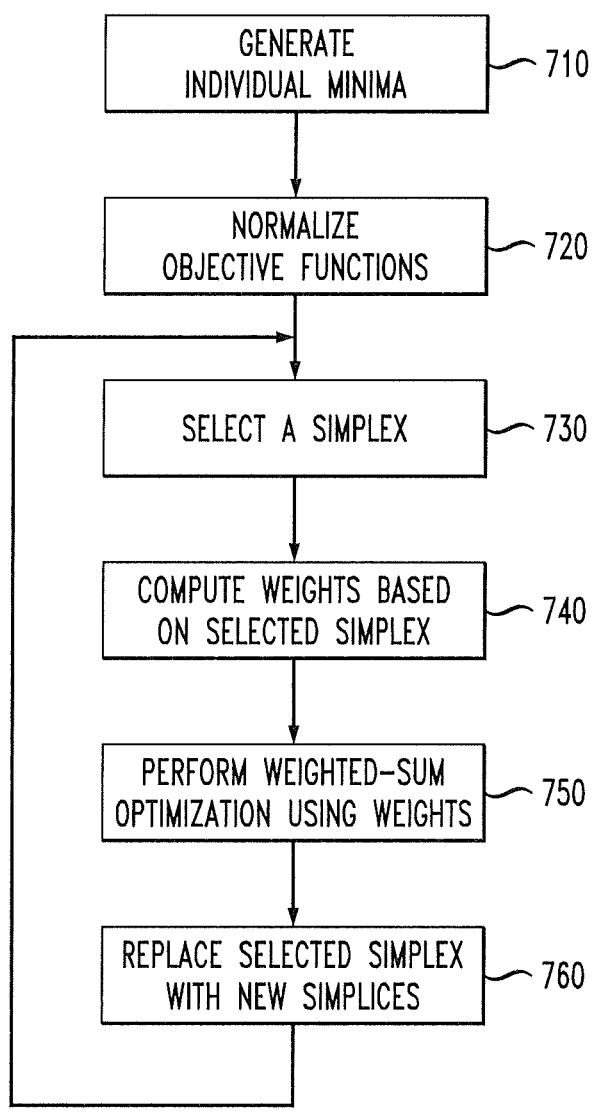
FIG. 7 is a flowchart illustrating an exemplary technique according to an illustrative embodiment of the present invention.

FIG. 7 is a flowchart showing an exemplary technique for derivative pursuit (DP) according to an illustrative embodiment of the present invention. First, a set of simplices $\mathcal{Z}$ is initialized with a single simplex approximation in steps 710 and 720. Next, samples on the Pareto front are iteratively generated such that they are uniformly spread out on the front, irrespective of the local gradient behavior. This iterative generation includes three main steps 730, 740, 750 and 760) in each iteration.

In step 710, individual minima $\{f_i^I\}_{i=1}^d$ are generated by minimizing one objective at a time and ignoring the others. Once $\{f_i^I\}_{i=1}^d$ are generated, the objective functions are normalized in step 720, such that the utopia point is now the origin and the nadir point is at the far corner of the unit cube. This may involve the use of the transformation:

$$f_i(x) \leftarrow \frac{f_i(x) - f_i^U}{f_i^N - f_i^U}, i \in \{1, \ldots, d\}. \tag{20}$$

The single simplex formed by connecting the individual minima together then lies within this unit cube, with the vertices lying on the boundary of the unit cube.

In step 730, one simplex S is selected from $\mathcal{Z}$. Preferably, simplex S is selected from $\mathcal{Z}$ in a manner which favors sparsely sampled regions of the Pareto front over densely sampled regions. For example, one could use the volume of each simplex as a measure of the sparsity of its vertices. Then, the distribution of simplex volumes is used to guide the choice of simplex for the next iteration.

In one embodiment, a deterministic method could be utilized in which the largest simplex is picked. Alternatively or additionally, a probabilistic method could be used in which each member of $\mathcal{Z}$ is assigned a probability that is proportional to its (d−1)-dimensional volume (surface area of triangle for d=3). S is then picked randomly from the categorical probability distribution assigned to $\mathcal{Z}$. Such a technique would tend to pick larger simplices which correspond to sparsely sampled regions of the Pareto front.

Figure 8:
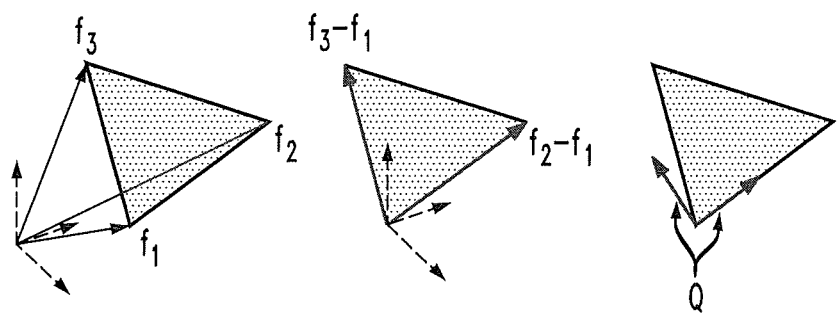
FIG. 8 shows computation of a volume of a simplex according to an illustrative embodiment of the present invention.
Figure 9:
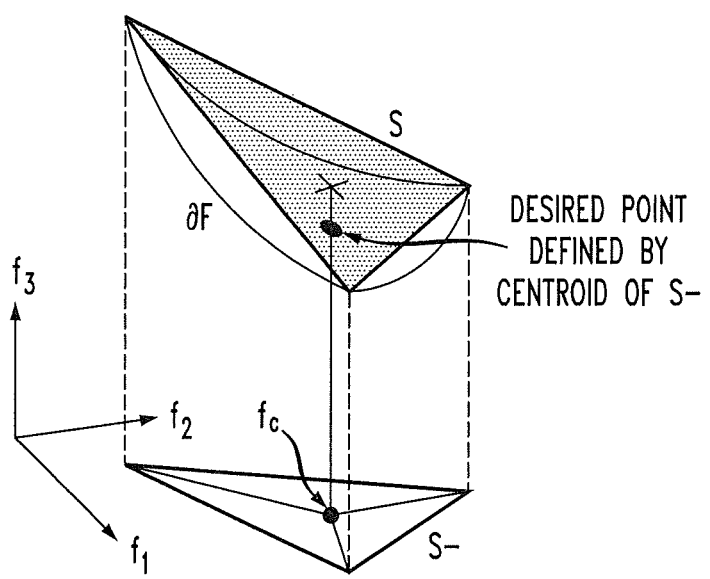
FIG. 9 shows selection of target derivatives according to an illustrative embodiment of the present invention.

An embodiment may include the computation of the volume of any newly-created simplices that are created, as shown in FIG. 8. The volume of any (d−1)-dimensional simplex S with d vertices $(y_1, \ldots, y_d,$ where $y_i = \{y_{i1}, \ldots, y_{i(d-1)}\})$ is given by $$Vol(S) = \frac{|(y_2 - y_1) \ldots (y_d - y_1)|}{(d-1)!}. \tag{21}$$

Note that $y_i$ are (d−1)-dimensional vectors, whereas simplex S is defined using d-dimensional vectors $f_v$, $v \in V(S)$. Thus, to use (22) it is necessary to define S in a (d−1)-dimensional coordinate system.

To perform this definition, one must first find a (d−1)-dimensional orthonormal basis for the hyperplane in which S lies with the origin at one vertex of S. Then one can represent all vertices using this (d−1)-dimensional basis. Let $\{f_1, \ldots, f_d\}$ be the set of vertices V(S) represented in the d-dimensional space $\mathcal{F}$. The simplex is translated such that $f_1$ is at the origin and the vertices are then given by $$\{0, (f_2 - f_1), \ldots, (f_d - f_1)\}. \tag{22}$$

The following matrix can then be defined $$\Delta F = [(f_2 - f_1) \ldots (f_d - f_1)]. \tag{23}$$

The columns of this matrix form a basis for the hyperplane containing S. The thin QR decomposition of this d×(d−1) matrix gives us an orthonormal basis for this hyperplane:

$$\Delta F = QR, \tag{24}$$

where the columns of Q form the orthonormal basis. Q can be computed using Gram-Schmidt orthonormalization. Thin QR decomposition and Gram-Schmidt orthonormalization are both described in G. H. Golub and C. F. Van Loan, "Matrix Computations," JHU Press, 3 ed., 1996, incorporated by reference herein. Next, the simplex vertices (22) are projected onto this basis set to obtain a (d−1)-dimensional representation of S:

$$Y = Q^T [0 \; \Delta F] = [0 \; Q^T \Delta F], \tag{25}$$

where the i-th column of Y is the i-th vertex of S in the (d−1)-dimensional space defined by ∆F and, equivalently Q. Plugging this into (21), one derives $$Vol(S) = \frac{|Q^T \Delta F|}{(d-1)!}. \quad (26)$$

In step 740, an appropriate set of weights a is selected to run a new optimization. This new set of weights is selected as a function of the corners of the selected simplex. Ideally, α is selected such that the resulting solution is centrally positioned on ∂F with respect to the vertices of the simplex, so as to maximize the uniformity of the points on ∂F. Because we do not have a direct relation between the objective values of any Pareto point and the weights, we use a heuristic by exploiting the relationship between the partial derivatives of ∂F and the weights. For simplicity, any partial derivative $$\frac{\partial f_d}{\partial f_i}$$

will be notated herein as simply $\partial_i$. Let $\mathcal{F}^-$ be the (d−1)-dimensional space defined by $\{f_1, \ldots, f_{d-1}\}$ and let any vector in this space be denoted with a − superscript, as f⁻.

As shown in FIG. 8, S⁻ is the projection of S onto $\mathcal{F}^-$. S⁻ is also a (d−1)-simplex. Every partial derivative $\partial_i$ can be modeled, for i={1, ..., d−1}, as a linear function of f⁻={f₁, ..., f_{d-1}}:

$$s = [\partial_1 \ldots \partial_{d-1}]^T = Af^- + b,$$

$$\text{s.t. } Af_v^- + b = s_v, \forall v \in V(S), \quad (27)$$

where V(S) is the set of the vertices of S, A and b are the matrix and vector defining the linear functions, $f_v^-$ is some vertex of S⁻ and $s_v$ is the vector s at that vertex. Note that, since vertex v was generated using some known α in (7), the vector $s_v$ can be derived using (16). Equation (27) says that the linear functions are simply interpolations from the vertices of the simplex S. The new desired point on ∂F is the projection of the centroid of S⁻ on to ∂F. This desired point would have the desirable property of being equidistant from all simplex vertices at least in $\mathcal{F}^-$.

In one technique, referred to hereon as the centroid method, the weights are computed based on the centroid of partial derivatives of the corners. Let $f_c^-$ denote the centroid of S⁻. Using the model of (28), the partial derivatives of ∂F at this desired point are estimated as $$s_c = Af_c^- + b = A\left(\frac{1}{d}\sum_{v \in V(S)} f_v^-\right) + b \quad (28)$$

$$= \frac{1}{d}\sum_{v \in V(S)}(Af_v^- + b) = \frac{1}{d}\sum_{v \in V(S)} s_v,$$

which is the just the centroid of the simplex defined by V(S) in the s space. From this set of partial derivatives, a set of optimization weights is computed by manipulating (16) and (28):

$$\alpha_c = -\frac{s_c}{1 - \sigma_{s_c}} = -\frac{\frac{1}{d}\sum_{v \in V(S)} s_v}{1 - \frac{1}{d}\sum_{v \in V(S)} \sigma_{s_v}}, \text{ where } \sigma_s = \sum_{j=1}^{d-1} s_j \quad (29)$$

This set of weights can then be used to drive the next optimization run. Note that if the parial derivative model (27) is accurate, the optimization will land on the desired point on ∂F. In the general case, this model serves as an approximate guide, by trying to exploit currently available information about ∂F.

Alternatively or in addition, one could compute the gradients of the plane passing through the simplex corners then compute the weights from these gradients using (16). That is, the linear model can be discarded and instead one could simply use the centroid (mean) of the $\alpha_v$, vectors, for all v∈V(S). It is important to note that the term $$\frac{\partial f_d}{\partial f_i}(f^{\alpha*}),$$

found on the left-hand side of (16), could be equivalent to either the centroid of the partial derivatives of the corners of the simplex or the gradients of the plane passing through the corners of the simplex.

For example, there are certain regions where the linear model does not fit. These are near the edges and corners of ∂F, where one or more partial derivatives rapidly go to −∞. This happens whenever any of the optimization objectives in (7) has a weight very close to 0. To see this mathematically, consider the case where $f_d$ has a weight of 0; i.e., $\Sigma_{i=1}^{d-1}\alpha_i=1$. This would happen, for instance when one optimizes for the i-th individual minimum $f_i^I$ by setting $\alpha_i=1$. If the simplex S has a vertex v with such a choice of α, one will obtain $s_v = \{-\infty, \ldots, -\infty\}$ The partial derivatives across this simplex could not then be interpolated using a linear model. The linear interpolation model (plane method) of $\alpha_v$ can be used in terms of f⁻ across such simplices.

Thus, a hybrid method could be utilized in which the plane method is used when simplex plane gradients are all negative, otherwise the centroid method is used. Of course, any combination of the plane method and/or centroid method, or other methods, may be utilized in conjunction with illustrative embodiments of the present invention.

In step 750, a new solution $f^{\alpha*}$ is computed in the manner discussed above with reference to FIG. 2B. In step 760, S is replaced with d new simplices. These new simplices are each defined by replacing a vertex in V(S), the set of vertices in S, with a vertex at the new solution $f^{\alpha*}$:

$$\mathcal{Z} = \mathcal{Z}_{-S} + \{\text{simplex}[(V(S)\setminus v) \cup \text{vertex}(f^{\alpha*})] : \forall v \in V(S)\} \quad (30)$$

The process then repeats at step 730 with the selection of another simplex S from $\mathcal{Z}$.

SRAM bitcell design offers a potential application for tradeoff exploration methods like those described herein, though one skilled in the art will appreciate that the techniques described herein are applicable to a variety of multi-objective optimization problems. The electrical goodness of a bitcell can be measured in terms of four metrics:

1. Read current, $I_{read}$: This is the DC current through the access transistor when its internal node is at 0, the bitline is high and the wordline is active. $I_{read}$ is a measure of the peripheral-independent read access speed of the cell: as the current sourced by the access transistor is higher, the bitline fall during the read will be faster. Typically, one would want this current to be as large as possible, or at least above a threshold that may be required by the array designers.

2. Leakage current, $I_{leak}$: This is the DC current that sinks to ground from an unaccessed cell (i.e., when the wordline is inactive and bitlines are high). It combines all the leakage components from the inverters and the access devices that is wasted during standby. Typically, one would want this current to be as small as possible, or at least below some acceptable threshold, which may be specified by the array designers.

3. Access disturb margin ADM: The ADM is a yield metric that measures the robustness of the cell to disturbance during access, in the presence of device mismatch resulting from manufacturing variations. This mismatch is largely from random dopant fluctuation, and can be modeled by Gaussian distributions on the device threshold voltages ($V_t$).

To measure the ADM, the cell can be placed in a peripheral circuit that represents a relevant application space for the cell. An access (wordline pulse and bitline precharge pulse) is simulated at the expected operating frequency and the device $V_t$s are skewed until the cell flips, to estimate the worst-case failing distance in $V_t$ space.

To compute the ADM, the $V_t$ Gaussians are integrated over the failure region, estimated by assuming a failing boundary that is linear and normal to this worst-case $V_t$ vector. This integral is an estimate of the cell stability failure probability $P_f$, from which the ADM is computed as the equivalent number of standard deviations ($\sigma$ s) on a standard normal:

$$\mathrm{ADM} = \Phi^{-1}(1-P_f) \quad (31)$$

One typically wants the ADM to satisfy a minimum specified threshold that is set by the array size N, the desired array yield $Y_{arr}$ and the number of redundant bits r in the array:

$$Y_{arr} \approx \sum_{k=0}^{r} \frac{(P_f N)^k e^{-P_f N}}{k!} \quad (32)$$

4. Write access margin WRM: The WRM is similar to the ADM, except that the operation is a write operation and failure occurs when the cell $V_t$s are skewed enough such that a write is not successful given the operating supply voltage and frequency.

One may wish to sample the tradeoff curve between $I_{read}$ and $I_{leak}$ under the following constraints on the yield:

$$\mathrm{ADM} > 5\sigma, \mathrm{WRM} > 5\sigma \quad (33)$$

This will ensure that any solution on the Pareto front will satisfy the yield requirement. The design variables here are the nominal $V_t$s of the three device types in the cell: the access nFET (PG), the pull-up pFET (PU) and the pull-down nFET (PD).

This represents a common design scenario for a bitcell where the layout parameter may be fixed early in the technology development because of area and time-to-market constraints. Later in the product development cycle, if the performance and/or leakage requirements from the cell change then it is very expensive to change device dimensions because that will require a redesign of the cell layout and, worse, reordering of several expensive masks. Tuning the $V_t$s is, however, much cheaper since no changes to layout and masks are needed, minimizing any expensive design and technology cascade effects. Knowledge of the yield-constrained tradeoff curve between power ($I_{leak}$) and performance ($I_{read}$) is then very useful since it gives complete information regarding the application range of the bitcell layout. To keep the $V_t$s within some practical range, one could further impose:

$$V_{t,xx} \epsilon V_{t,xx}^0 + [-200 \text{ mV}, +200 \text{ mV}] \text{ for } xx = \mathrm{PG, PD, PU} \quad (34)$$

where $V_{t,xx}^0$ some nominal starting value for each $V_t$. The weighted optimization problem then is $$\min_{V_{t,PG}, V_{t,PD}, V_{t,PU}} \alpha I_{read} + (1-\alpha) I_{leak}, \quad (35)$$

s.t. (33) and (34) are met.

In order to test the techniques described herein, the inventors simulated a 6-T SRAM cell in an industrial 22 nm technology using a derivative free circuit optimizer based on the DFO method described in A. Conn et al, "A Derivative-Free Optimization Algorithm in Practice," Symp. Multidisc. Anal. Optim., 1998, incorporated by reference herein. DFO is a trust-region based method that employs quadratic models for the trust region and intelligent region and model maintenance techniques to achieve robust convergence. Each optimization run used 42 circuit simulations on average.

Figure 10A:
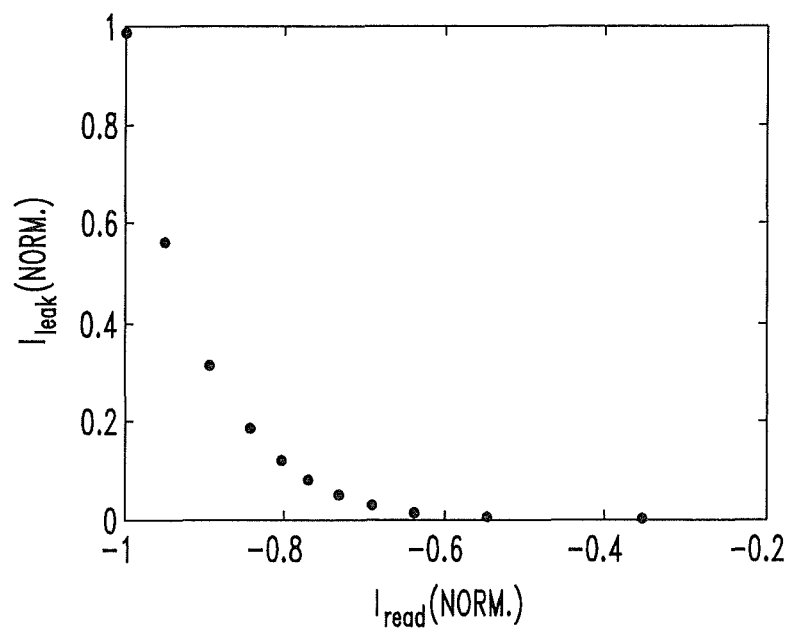
FIG. 10A shows 11 Pareto samples for a tradeoff surface associated with an SRAM design problem according to a uniform sweep.
Figure 10B:
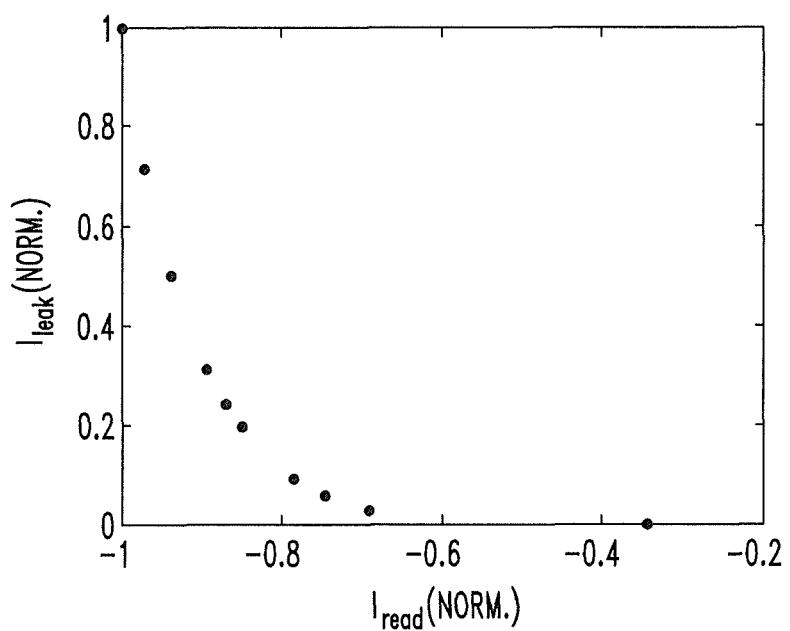
FIG. 10B shows 11 Pareto samples for a tradeoff surface associated with an SRAM design problem according to an illustrative embodiment of the present invention.

FIG. 10A shows results generated from a uniform sweep of $\alpha$. FIG. 10B shows results generated using a DP technique according to the present invention. Both FIGS. 10A and 10B include 11 data points. Because of the non-uniform distribution of the slope along $\partial F$, the uniform method tends to cluster the points in the low leakage regions, while DP can overcome these artifacts. It should be noted that the Pareto curve appears to be convex.

The inventors also tested DP on a synthetic problem in three dimensions, employing MATLAB™, commercially available from Mathworks, Inc., to perform each optimization in this case.:

$$\min_{x \in \mathbb{R}^3} \alpha_1 f_1 + \alpha_2 f_2 + (1-\alpha_1-\alpha_2) f_3 \quad (36)$$

$$f_1 = -10x_1, f_2 = -x_2, f_3 = -4x_3$$

$$x_1^4 + 2x_2^3 + 5x_3^2 - 1 \leq 0.$$

Figure 11A:
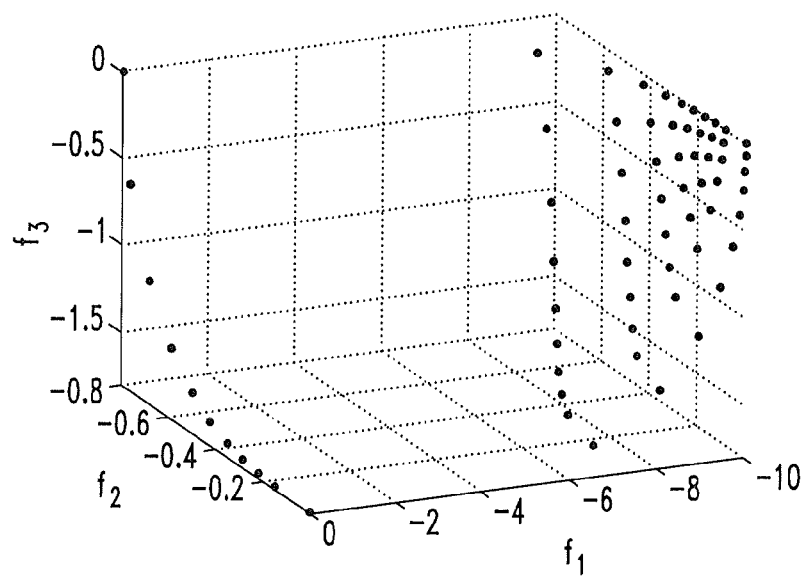
FIG. 11A shows 66 Pareto samples for a three-dimensional tradeoff surface according to a uniform sweep.
Figure 11B:
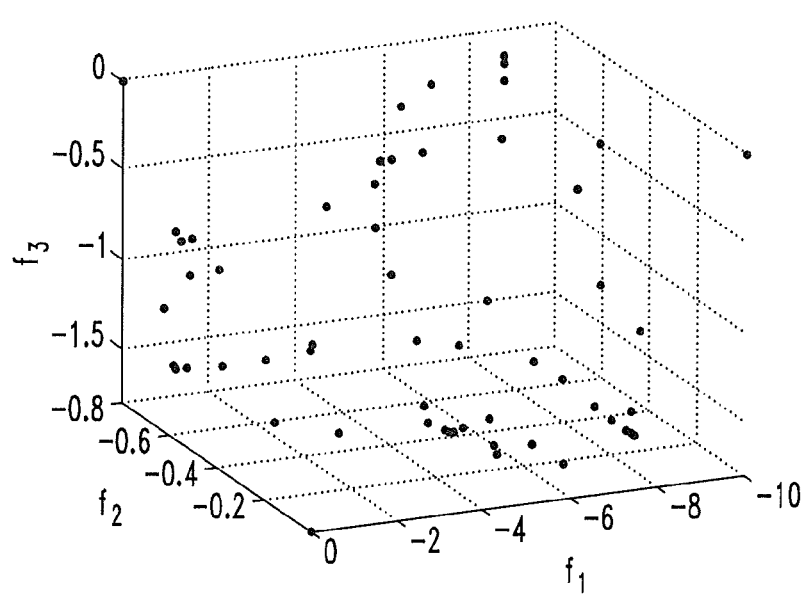
FIG. 11B shows 66 Pareto samples for a three-dimensional tradeoff surface according to an illustrative embodiment of the present invention.

FIG. 11A shows results generated from a uniform sweep of $\alpha$. FIG. 11B shows results generated using a DP technique according to the present invention. Both FIGS. 11A and 11B include 66 data points. The differences are more dramatic here because of more discrepancy in the distribution of partial derivatives across $\partial F$. A large part of the Pareto surface is left completely unsampled by the uniform sweep, while some other parts are overly sampled. This is because the uniform sweep does not compensate for the behavior of the partial derivatives. DP, on the other hand, does a much better job of covering the entire surface.

Figure 12A:
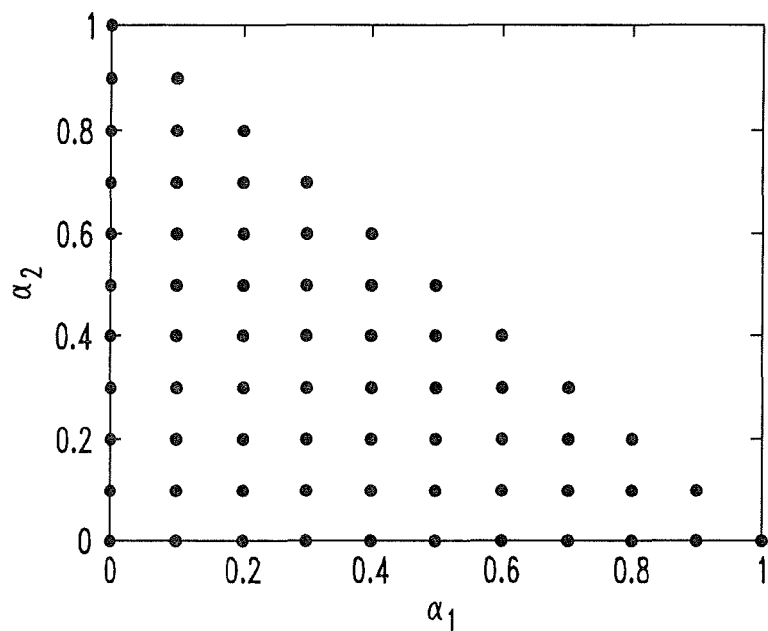
FIG. 12A shows a distribution of 66 Pareto sampling weights for a three-dimensional tradeoff surface according to a uniform sweep.
Figure 12B:
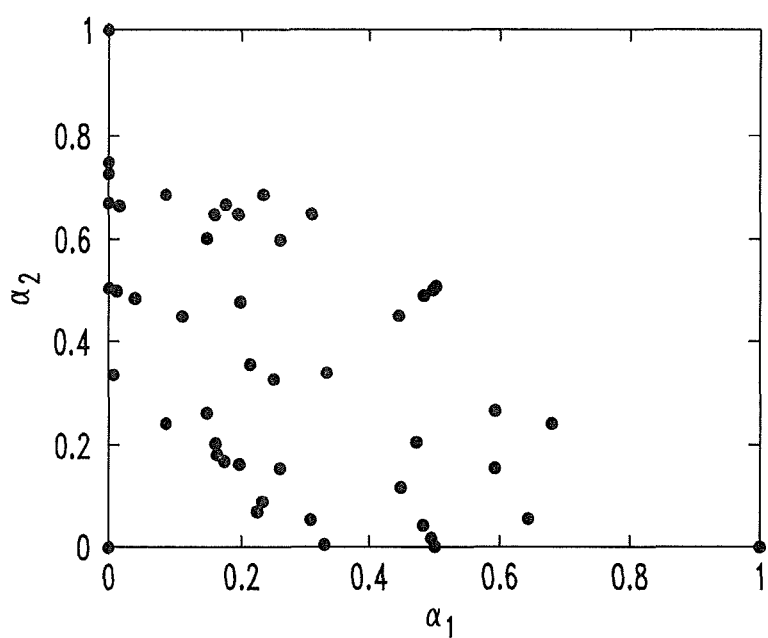
FIG. 12B shows a distribution of 66 Pareto sampling weights for a three-dimensional tradeoff surface according to an illustrative embodiment of the present invention.

FIG. 12A shows the distribution of $\alpha$ for the uniform sweep described with reference to FIG. 10A. FIG. 12B shows the distribution of $\alpha$ for the technique described with reference to FIG. 10A. The distribution of $\alpha$ shown in FIGS. 12A and 12B clearly indicates that a non-uniform distribution of $\alpha$ is needed to obtain a uniform distribution of points on $\partial F$.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Such a system may include distinct software modules (for example, a partitioning module executing on a hardware processor). Furthermore, aspects of the present invention may take the form of a computer program product embodied in one or more computer readable medium(s) having computer readable program code embodied thereon.

Additionally, the techniques as heretofore described can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 13:
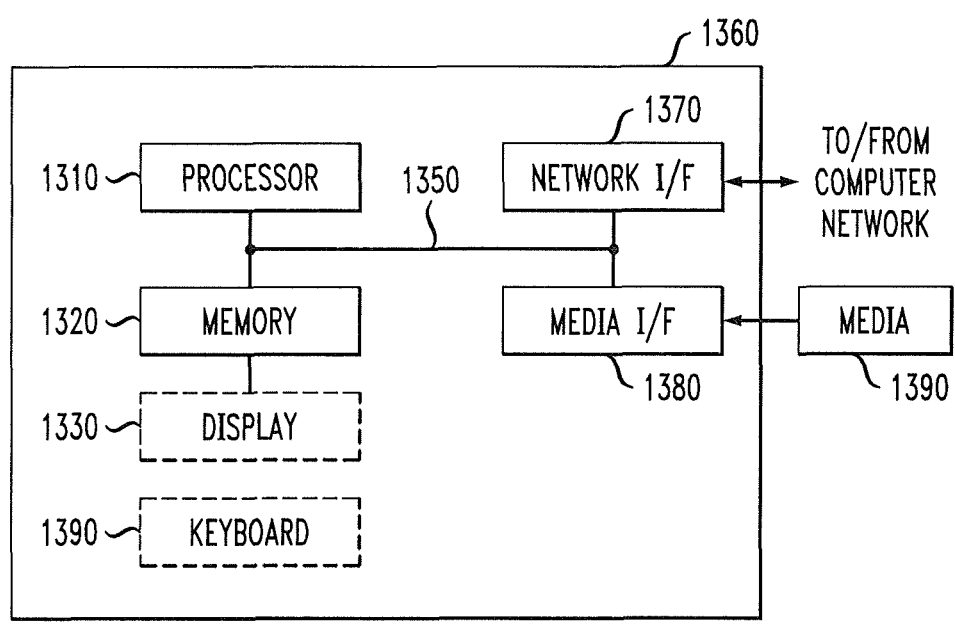
FIG. 13 shows a computer system that may be useful in implementing one or more aspects and/or elements of the invention.

One or more embodiments can make use of software running on a general purpose computer or workstation. With reference to FIG. 13, such an implementation employs, for example, a processor 1310, a memory 1320, and an input/output interface formed, for example, by a display 1330 and a keyboard 1340. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 1310, memory 1320, and input/output interface such as display 1330 and keyboard 1340 can be interconnected, for example, via bus 1350 as part of a data processing unit 1360. Suitable interconnections, for example via bus 1350, can also be provided to a network interface 1370, such as a network card, which can be provided to interface with a computer network, and to a media interface 1380, such as a diskette or CD-ROM drive, which can be provided to interface with media 1390.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1390) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

A data processing system suitable for storing and/or executing program code can include at least one processor 1310 coupled directly or indirectly to memory elements 1320 through a system bus 1350. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 1340, display 1330, pointing device, and the like) can be coupled to the system either directly (such as via bus 1350) or through intervening I/O controllers (omitted for clarity).

Network adapters such as network interface 1370 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1360 as shown in FIG. 13) running a server program. It will be understood that such a physical server may or may not include a display and keyboard.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus for use in optimizing a plurality of objectives, the apparatus comprising:
 a processor; and
 a memory coupled to the processor;
 wherein the processor is operative to perform the steps of:
  initializing a set of simplices;
  selecting a simplex from the set of simplices;
  computing one or more weights based at least in part on the selected simplex;
  generating a point on a tradeoff surface by utilizing the one or more weights in a weighted-sum optimization;
  replacing the selected simplex within the set of simplices with one or more new simplices determined based at least in part on the generated point; and
  repeating the selecting, computing, and generating steps.

2. The apparatus of claim 1, wherein the one or more new simplices are determined by replacing one or more vertices of the selected simplex with one or more vertices based on the generated point.

3. The apparatus of claim 1, wherein the initializing step comprises determining an initial simplex based at least in part on individual minima for at least a portion of the plurality of objectives.

4. The apparatus of claim 1, wherein the simplex is selected based at least in part on volumes of respective simplices comprising at least a portion of the set of simplices.

5. The apparatus of claim 4, wherein the simplex is selected based at least in part on probabilities assigned to the respective simplices, the probability assigned to a given simplex being proportional to the volume of the given simplex.

6. The apparatus of claim 1, wherein the computing step comprises computing the one or more weights based at least in part on a centroid of partial derivatives of at least a portion of vertices of the selected simplex.

7. The apparatus of claim 1, wherein the computing step comprises computing the one or more weights based at least in part on one or more gradients of a plane passing through at least a portion of vertices of the selected simplex.

8. A non-transitory computer program product comprising a tangible computer readable recordable storage medium including computer usable program code for optimizing a plurality of objectives, the computer program product comprising computer usable program code for performing steps of:
 initializing a set of simplices;
 selecting a simplex from the set of simplices;
 computing one or more weights based at least in part on the selected simplex; and
 generating a point on a tradeoff surface by utilizing the one or more weights in a weighted-sum optimization, wherein the initializing step comprises determining an initial simplex based at least in part on individual minima for at least a portion of the plurality of objectives.

9. The non-transitory computer program product of claim 8, wherein the computer usable program code is further operative to perform the steps of:
   replacing the selected simplex within the set of simplices with one or more new simplices determined based at least in part on the generated point; and
   repeating the selecting, computing, and generating steps.

10. The non-transitory computer program product of claim 9, wherein the one or more new simplices are determined by replacing one or more vertices of the selected simplex with one or more vertices based on the generated point.

11. The non-transitory computer program product of claim 8, wherein the simplex is selected based at least in part on volumes of respective simplices comprising at least a portion of the set of simplices.

12. The non-transitory computer program product of claim 11, wherein the simplex is selected based at least in part on probabilities assigned to the respective simplices, the probability assigned to a given simplex being proportional to the volume of the given simplex.

13. The non-transitory computer program product of claim 8, wherein the computing step comprises computing the one or more weights based at least in part on a centroid of partial derivatives of at least a portion of vertices of the selected simplex.

14. The non-transitory computer program product of claim 8, wherein the computing step comprises computing the one or more weights based at least in part on one or more gradients of a plane passing through at least a portion of vertices of the selected simplex.

15. An apparatus for use in optimizing a plurality of objectives, the apparatus comprising:
   a processor; and
   a memory coupled to the processor;
   wherein the processor is operative to perform the steps of:
      initializing a set of simplices;
      selecting a simplex from the set of simplices;
      computing one or more weights based at least in part on the selected simplex; and
      generating a point on a tradeoff surface by utilizing the one or more weights in a weighted-sum optimization, wherein the step of initializing includes initializing (k−1)-simplices in a k-D space.

* * * * *